(12) United States Patent
Gharbi et al.

(10) Patent No.: US 12,488,417 B2
(45) Date of Patent: Dec. 2, 2025

(54) PARAMETRIC COMPOSITE IMAGE HARMONIZATION

(71) Applicant: ADOBE INC., San Jose, CA (US)

(72) Inventors: Michael Yanis Gharbi, San Francisco, CA (US); Zhihao Xia, Sunnyvale, CA (US); Elya Shechtman, Seattle, WA (US); Ke Wang, Berkeley, CA (US); He Zhang, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 389 days.

(21) Appl. No.: 18/076,868

(22) Filed: Dec. 7, 2022

(65) Prior Publication Data
US 2024/0193724 A1    Jun. 13, 2024

(51) Int. Cl.
*G06T 3/4038* (2024.01)
*G06T 5/77* (2024.01)
*G06T 7/90* (2017.01)
*G06T 11/00* (2006.01)

(52) U.S. Cl.
CPC .............. *G06T 3/4038* (2013.01); *G06T 5/77* (2024.01); *G06T 7/90* (2017.01); *G06T 11/001* (2013.01); *G06T 2207/20081* (2013.01); *G06T 2207/20212* (2013.01)

(58) Field of Classification Search
CPC ........... G06T 3/4038; G06T 7/90; G06T 5/77; G06T 11/001; G06T 2207/20081; G06T 2207/20212
See application file for complete search history.

(56) References Cited

U.S. PATENT DOCUMENTS

| | | | |
|---|---|---|---|
| 2018/0260668 A1* | 9/2018 | Shen | G06V 10/82 |
| 2021/0233213 A1* | 7/2021 | Mejjati | G06N 3/045 |
| 2023/0122623 A1* | 4/2023 | Zhang | G06T 11/001 |
| | | | 382/100 |

FOREIGN PATENT DOCUMENTS

CN    111292408 A   *   6/2020   ............. G06K 9/629

* cited by examiner

*Primary Examiner* — Andrew M Moyer
*Assistant Examiner* — Conor A O'Malley
(74) *Attorney, Agent, or Firm* — Shook, Hardy & Bacon L.L.P.

(57) ABSTRACT

An image processing system employs a parametric model for image harmonization of composite images. The parametric model employs a two-stage approach to harmonize an input composite image. At a first stage, a color curve prediction model predicts color curve parameters for the composite image. At a second stage, the composite image with the color curve parameters is input to a shadow map prediction model, which predicts a shadow map. The predicted color curve parameters and shadow map are applied to the composite image to provide a harmonized composite image. In some aspects, the color curve parameters and shadow map are predicted using a lower-resolution composite image and up-sampled to apply to a higher-resolution version of the composite image. The harmonized composite image can be output with the predicted color curve parameters and/or shadow map, which can be modified by a user to further enhance the harmonized composite image.

15 Claims, 17 Drawing Sheets
(7 of 17 Drawing Sheet(s) Filed in Color)

US 12,488,417 B2

PARAMETRIC COMPOSITE IMAGE HARMONIZATION

BACKGROUND

Image compositing is a process often used in image editing to combine the foreground of one image with the background from another image. However, the quality of the composite image is often limited by visual inconsistencies between the foreground and the background due to different capture conditions for the two source images. To address these inconsistencies, image harmonization aims to adjust the appearance of the foreground and harmonize it with the background, for instance, by altering the color and shading of the foreground. Following image harmonization, the foreground object better matches the background, resulting in a composite image that is more realistic and plausible.

SUMMARY

Some aspects of the present technology relate to, among other things, an image processing system that employs a parametric model for image harmonization of composite images. The parametric model operates in two stages using a color curves prediction model and a shadow map prediction model. Given a composite image at the first stage, the color curves prediction model predicts color curve parameters for harmonizing the foreground and the background of the composite image. In the second stage, the composite image with the predicted color curve parameters is provided to the shadow map prediction model, which predicts a shadow map for harmonizing the foreground with the background. The predicted color curve parameters and shadow map are applied to the foreground of the composite image to generate a harmonized composite image. The harmonized composite can be output with the predicted color curve parameters and/or shadow map, allowing the user to modify the predicted color curve parameters and/or shadow map and further enhance the harmonized composite image.

In some aspects, the parametric model operates on a lower-resolution version of a composite image. The predicted color curves parameters and shadow map for the lower-resolution version is up-sampled and applied to a higher-resolution version of the composite image. For instance, the parametric model could operate on a 512×512 version of the composite image, while the predicted color curve parameters and shadow map are up-sampled and applied to a 4 k version of the composite image.

Further aspects of the technology described herein are directed to training the parametric model to predict color curve parameters and shadow maps for image harmonization. In accordance with some aspects, the parametric model is trained using two training streams: a first training stream based on supervised training using reconstruction loss and a second training stream based on unsupervised training using adversarial loss.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present technology is described in detail below with reference to the attached drawing figures, wherein.

DETAILED DESCRIPTION

Overview

Figure 1:
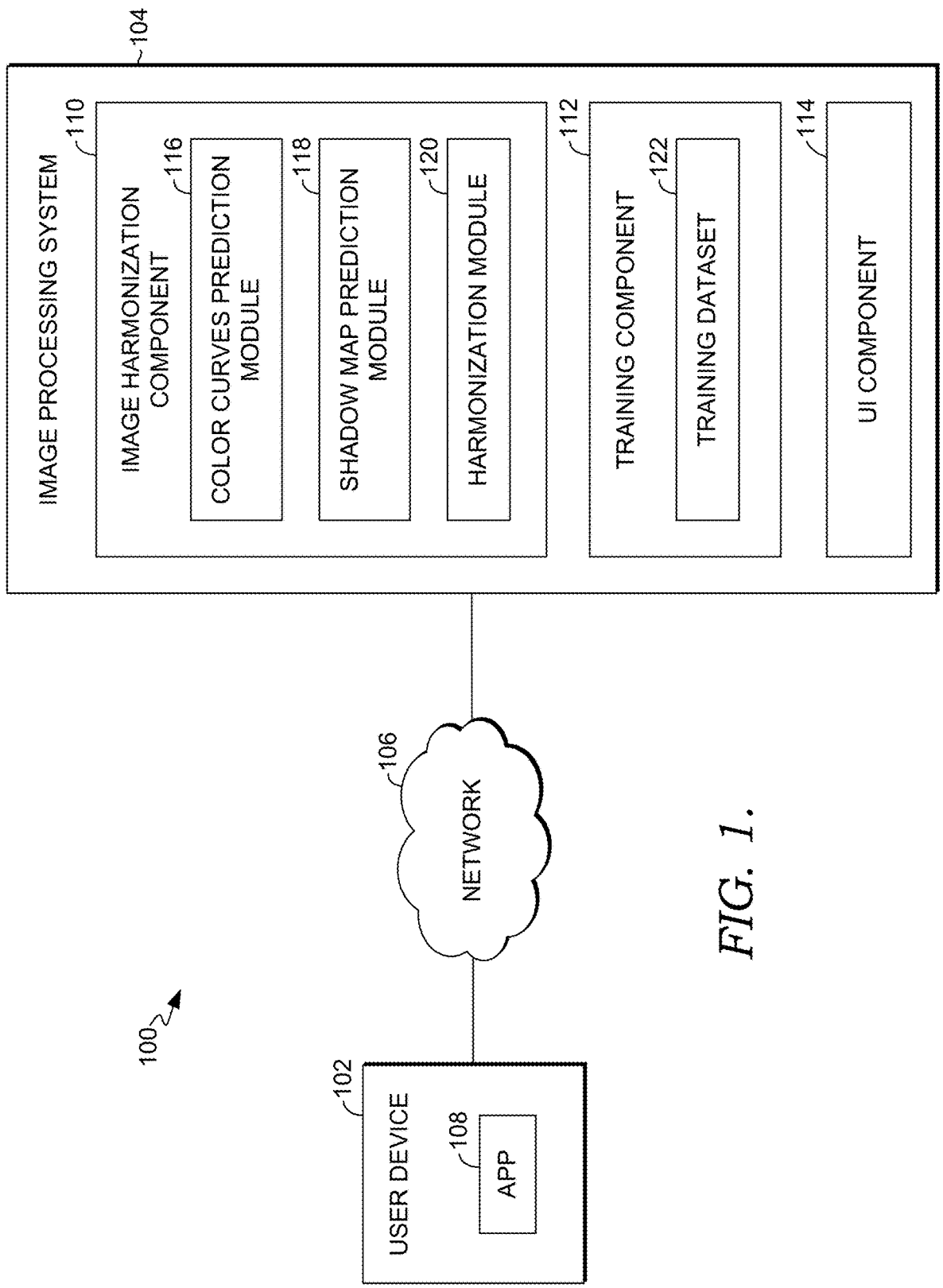
FIG. 1 is a block diagram illustrating an exemplary system in accordance with some implementations of the present disclosure.

Image harmonization of composite images has traditionally been done manually by users adjusting image parameters using image editing applications. In particular, users often harmonize composite images by applying different editing operations sequentially, where each operation focuses on matching a different element of the composite image (e.g., luminosity, color, shading). For instance, a user could begin by changing the global color curves (e.g., RGB curves) to match the tone and color between the foreground object and the background. Then, the user could perform local editing (e.g., adding self-shadow layers, adding cast shadows) to correct the local inconsistencies and lighting mismatches. Finally, the user can make some fine tuning edits, like smoothing image boundaries.

This manual process is parametric and user-controllable; the artist can easily incorporate personal preferences and custom styles into the harmonization work. This is in contrast with automatic image harmonization approaches using learning-based approaches, which are based on pixel-wise image-to-image translation networks (e.g., U-Net), where the model size and computational cost limit the potential for high-resolution image processing. These learning-based approaches are not parametric as they directly output the final harmonized images without exposing any controls (e.g., color curves, shadow maps, etc.) that allow the user to further enhance the composite images. Accordingly, the image harmonization task in these approaches is typically cast as a pixel-wise image-to-image translation problem, which suffers from computational inefficiency and is typically constrained to low-resolution images (e.g., 256×256 resolution).

Aspects of the technology described herein improve the functioning of the computer itself in light of these shortcomings in existing image harmonization technologies by providing a fully-parametric learning-based image harmonization framework. In accordance with some configurations, a parametric model provides a two-stage image harmonization approach using a color curves prediction model and shadow map prediction model. At a first stage, a composite image having a foreground and a background is provided as input to the color curves prediction model, which predicts color curve parameters for harmonizing the foreground with the background. At a second stage, the composite image and color curve parameters are provided as input to the shadow map prediction model, which predicts a shadow map for harmonizing the foreground with the background. The composite image is harmonized by applying the color curve parameters and shadow map to the foreground of the composite image to generate a harmonized composite image. A user interface can be provided that displays the harmonized composite image with the predicted color curve parameters and/or shadow map. The user can adjust the color curve parameters and/or shadow map to further enhance the harmonized composite image.

In accordance with some aspects, the parametric model operates on a down-sampled version of a composite image. Given a higher-resolution composite image (e.g., 4 k resolution), a down-sampled version of the composite image (e.g., 512×512 resolution) is generated and provided as input to the color curves prediction model. The color curves prediction model predicts color curve parameters, and the down-sampled version of the composite image with the predicted color curve parameters is provided as input to the shadow map prediction model, which predicts a shadow map. The predicted color curve parameters and shadow map are up-sampled, and the up-sampled color curve parameters and shadow map are applied to the original composite image (or another version of the composite image at a higher resolution than the down-sampled version) to provide a harmonized composite image at the higher resolution. It should be noted that "lower-resolution" and "higher-resolution" are used to refer to a resolution of one version of a composite image (e.g., a version used for color curve parameter and shadow map prediction) relative to a resolution of another version of the composite image (e.g., a version to which color curve parameters and a shadow map are applied to provide a harmonized composite image).

The parametric model can be trained to predict color curve parameters and shadow maps for harmonizing composite images using training images and any of a number of different loss functions. In some configurations, the parametric model is trained using two training streams: a first training stream based on supervised training using reconstruction loss, and a second training stream based on unsupervised training using adversarial loss. In some aspects, the supervised training uses composite images generated from image sets comprising before-retouching versions of images, after-retouching versions of the images, and segmentation masks identifying foregrounds and backgrounds in the images. Each composite image is generated by combining a foreground of a before-retouching version of an image with a background of the after-retouching version of that image or vice versa. A composite image generated in this manner is provided as input to the parametric model, which predicts color curve parameters and a shadow map that are applied to the composite image to provide a harmonized composite image. The reconstruction loss is determined based on the harmonized composite image and a ground truth image, which is either the before-retouching version or after-retouching version used to generate the composite image (depending on which background version was used to generate the composite image).

In some aspects, the unsupervised training employs an adversarial loss determined using a composite image generated by taking an image, removing a foreground, in-painting the background, and adding a foreground object to the in-painted background. A composite image generated in this manner is provided as input to the parametric model, which predicts color curve parameters and a shadow map that are applied to the composite image to provide a harmonized composite image. The harmonized composite image is provided as a "fake" example to a discriminator, and an adversarial loss is determined for updating the parametric model.

Aspects of the technology described herein provide a number of improvements over existing technologies. For instance, the parametric model predicts color curve parameters and shadow maps that are applied to harmonize a composite image, eliminating the need for a user to manually harmonize the composite image. At the same time, since the model is parametric, users can adjust the predicted color curve parameters and/or shadow map to further enhance a harmonized composite image. As such, the approach described herein gives users full controllability over the final composite image (e.g., via color curves and a shadow map layer), to enable personalized creations beyond the default harmonization produced by the parametric model. In accordance with some aspects of the technology described herein, the color curve parameters act as a point-wise mapping on pixels intensities, which can be efficiently scaled to any resolution beyond the resolution input to the first stage. Additionally, since the shadow map is a lower-resolution smooth map without high-frequency textures, it can be easily up-sampled to higher resolutions without noticeable visual differences. As such, the approach described herein is a two-stage parametric model that can be directly applied to any-resolution images without retraining the model, thus keeping its computation cost manageable. Experiments show that the parametric model described herein outperforms previous image harmonization methods in terms of image quality, while providing users with expressive, fully parametric controls.

Example System for Parametric Composite Image Harmonization

With reference now to the drawings, FIG. 1 is a block diagram illustrating an exemplary system 100 for providing parametric image harmonization for composite images in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and an image processing system 104. Each of the user device 102 and image processing system 104 shown in FIG. 1 can comprise one or more computer devices, such as the computing device 1700 of FIG. 17, discussed below. As shown in FIG. 1, the user device 102 and the image processing system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of user devices and server devices can be employed within the system 100 within the scope of the present technology. Each can comprise a single device or multiple devices cooperating in a distributed environment. For instance, the image processing system 104 could be provided by multiple server devices collectively providing the functionality of the image processing system 104 as described herein. Additionally, other components not shown can also be included within the network environment.

The user device 102 can be a client device on the client-side of system 100, while the image processing system 104 can be on the server-side of system 100. The image processing system 104 can comprise server-side software designed to work in conjunction with client-side software on the user device 102 so as to implement any combination of the features and functionalities discussed in the present disclosure. For instance, the user device 102 can include an application 108 for interacting with the image processing system 104. The application 108 can be, for instance, a web browser or a dedicated application for providing functions, such as those described herein. This division of system 100 is provided to illustrate one example of a suitable environment, and there is no requirement for each implementation that any combination of the user device 102 and the image processing system 104 remain as separate entities. While the system 100 illustrates a configuration in a networked environment with a separate user device and image processing system, it should be understood that other configurations can be employed in which components are combined. For instance, in some configurations, a user device can also provide image processing capabilities.

The user device 102 comprises any type of computing device capable of use by a user. For example, in one aspect, the user device comprises the type of computing device 1700 described in relation to FIG. 17 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user can be associated with the user device 102 and can interact with the image processing system 104 via the user device 102.

At a high level, the image processing system 104 employs a parametric model to provide image harmonization to composite images. As shown in FIG. 1, the image processing system 104 includes an image harmonization component 110, a training component 112, and a user interface component 114. The components of the image processing system 104 can be in addition to other components that provide further additional functions beyond the features described herein. The image processing system 104 can be implemented using one or more server devices, one or more platforms with corresponding application programming interfaces, cloud infrastructure, and the like. While the image processing system 104 is shown separate from the user device 102 in the configuration of FIG. 1, it should be understood that in other configurations, some or all of the functions of the image processing system 104 can be provided on the user device 102.

In one aspect, the functions performed by components of the image processing system 104 are associated with one or more applications, services, or routines. In particular, such applications, services, or routines can operate on one or more user devices, servers, can be distributed across one or more user devices and servers, or be implemented in the cloud. Moreover, in some aspects, these components of the image processing system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The image harmonization component 110 of the image processing system 104 employs a parametric model to provide image harmonization for composite images. The parametric model includes two stages: a first stage in which a color curves prediction model predicts color curve parameters for harmonizing a composite image; and a second stage in which a shadow map prediction model predicts a shadow map to harmonize the composite image. As shown in FIG. 1, the image harmonization component 110 includes a color curves prediction module 116, a shadow map prediction module 118, and a harmonization module 120.

Given a composite image with a foreground and a background, the color curves prediction module 116 predicts color curve parameters to apply to the foreground of the composite image to harmonize the foreground with the background of the composite image. The color curves prediction module 116 includes a machine learning model (i.e., color curves prediction model) trained by the training component 112 to perform color curve parameter prediction, as will be described in further detail below. The machine learning model can comprise a neural network such as, for instance, a ResNet-based network.

Given the composite image and the color curve parameters predicted by the color curves prediction module 116, the shadow map prediction module 118 predicts a shadow map to apply to the foreground of the composite image to harmonize the foreground with the background of the composite image. The shadow map prediction module 118 includes a machine learning model (i.e., shadow map prediction model) trained by the training component 112 to perform shadow map prediction, as will be described in further detail below. The machine learning model can comprise a neural network such as, for instance, a neural network based on a U-Net architecture.

The harmonization module 120 applies the color curve parameters predicted by the color curves prediction module 116 and the shadow map predicted by the shadow map prediction module 118 to the foreground of the composite image. This provides a harmonized composite image in which the foreground is harmonized with the background.

Figure 2:
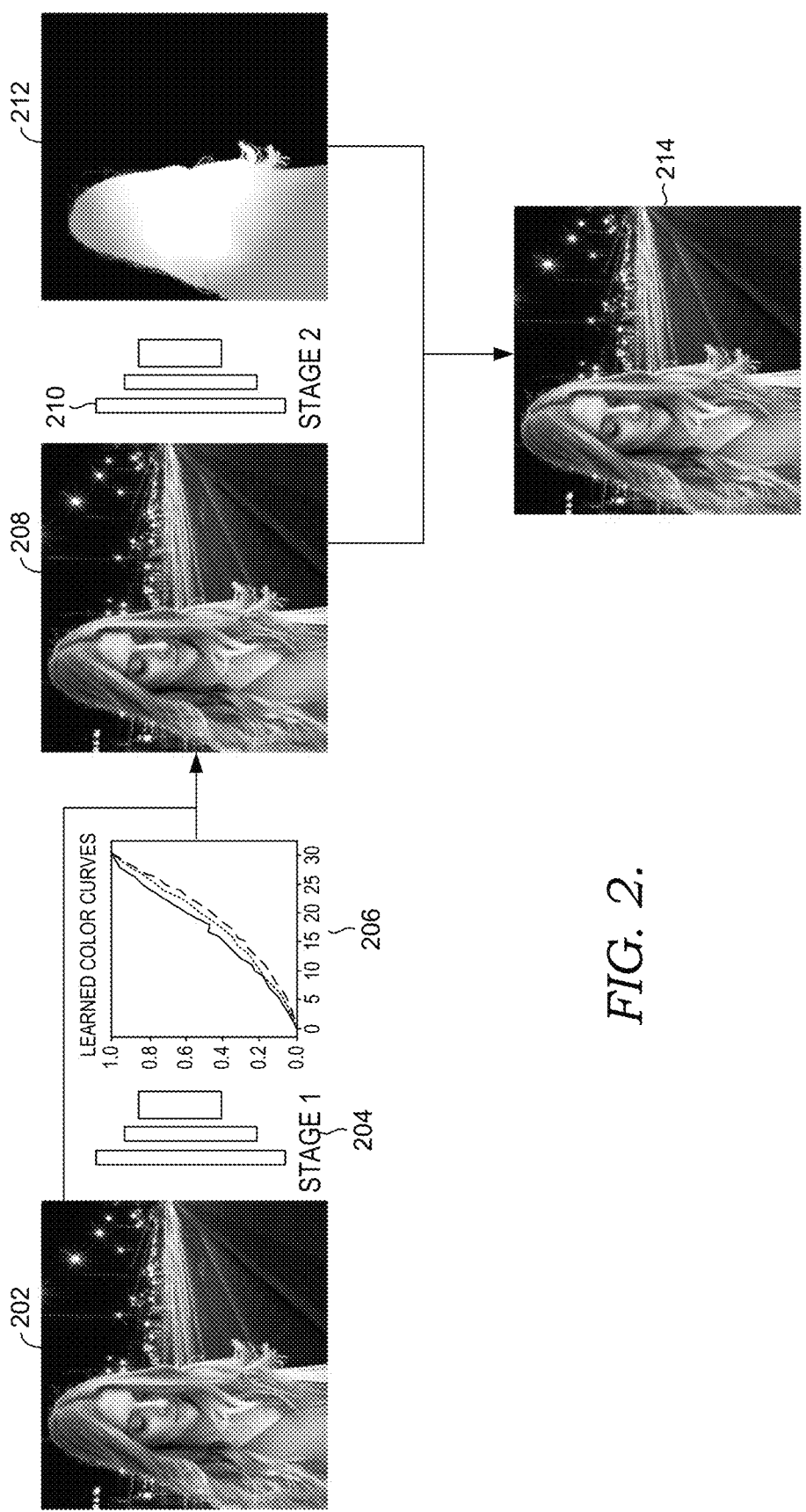
FIG. 2 is a diagram illustrating image harmonization performed on a composite image in accordance with some implementations of the present disclosure.

FIG. 2 provides a diagram illustrating image harmonization performed on a composite image, for instance by the image harmonization component 110 of FIG. 1. As shown in FIG. 2, a composite image 202 that includes a foreground and a background is provided as input to a color curves prediction model 204 as a first stage of a parametric model. The color curves prediction model 204 predicts color curve parameters 206 for the composite image 202. The color curve parameters 206 are applied to the foreground of the composite image 202 to provide a first-stage harmonized image 208. The first-stage harmonized image 208 is provided as input to a shadow prediction model 210 as a second stage of the parametric model. The shadow prediction model 210 predicts a shadow map 212. The shadow map 212 is applied to the foreground of the first-stage harmonized image 208 to provide a harmonized composite image 214.

In some configurations, the color curves prediction module 116 and the shadow map prediction module 118 operate on a down-sampled version of an input composite image to predict color curve parameters and a shadow map, while the harmonization module 120 up-samples the predicted color curve parameters and shadow map and applies the up-sampled color curve parameters and shadow map to the input composite image to provide a harmonized composite image.

Figure 3:
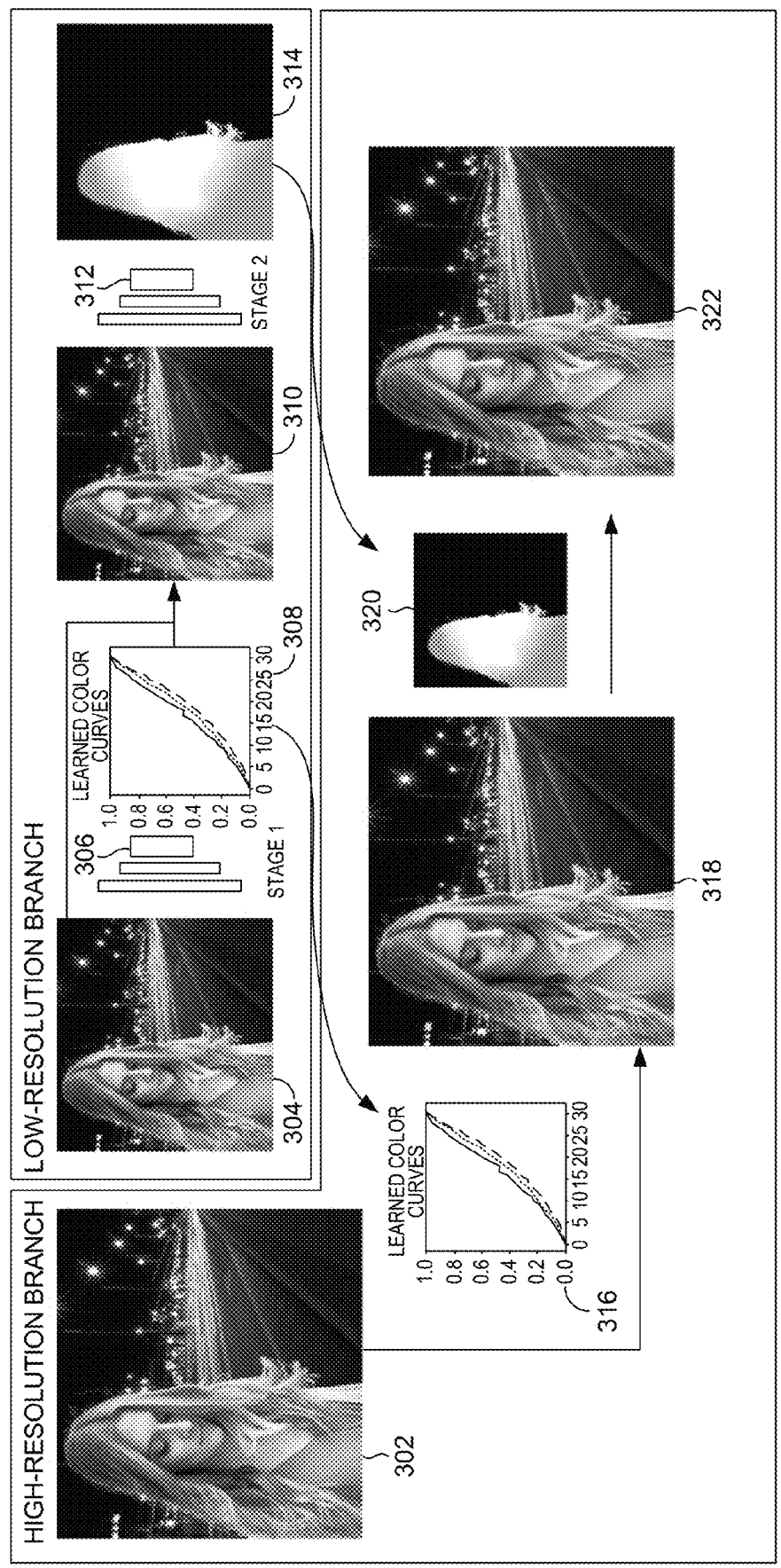
FIG. 3 is a diagram illustrating image harmonization using a down-sampled version of a composite image in accordance with some implementations of the present disclosure.

FIG. 3 provides a diagram illustrating image harmonization using a down-sampled version of a composite image, for instance by the image harmonization component 110 of FIG. 1. The process essentially involves two branches; a low-resolution branch in which color curve parameter prediction and shadow map prediction are performed on a lower-resolution version of a composite image; and a high resolution branch in which the color curve parameters and shadow map are up-sampled and applied to a higher-resolution (e.g., original resolution) version of the composite image to provide a harmonized composite image.

In the low-resolution branch of the process in FIG. 3, a composite image 302 with a foreground and background is down-sampled to provide a down-sampled composited image 304. For example, the composite image 302 may have a 4 k image resolution, while the down-sampled composite image 304 may have a 512×512 image resolution. The down-sampled composite image 304 is provided as input to a color curves prediction model 306 as a first stage of a parametric model. The color curves prediction model 306 predicts color curve parameters 308 for the down-sampled composite image 304. The color curve parameters 308 are applied to the down-sampled composite image 304 to provide a down-sampled first-stage harmonized image 310. The down-sampled first-stage harmonized image 310 is provided as input to a shadow prediction model 312 as a second stage of the parametric model. The shadow prediction model predicts a shadow map 314.

In the high-resolution branch of the process shown in FIG. 3, the color curve parameters 308 are up-sampled to provide up-sampled color curve parameters 316 that are applied to the composite image 302 to provide a first-stage harmonized image 318. Additionally, the shadow map 314 is up-sampled to provide an up-sampled shadow map 320 that is applied to the first-stage harmonized image 318 to provide a harmonized composite image 322.

With reference again to FIG. 1, the training component 112 trains the parametric model used by the image harmonization component 110 to perform parametric image harmonization for composite images. As previously discussed, the parametric model comprises two stages: a color curves prediction model and a shadow map prediction model. In some aspects, the parametric model is trained end-to-end using a training dataset 122 comprising training images. In some configurations, the training images have been down-sampled (e.g., to 512×512 resolution) in the interest of speed.

The training can be performed in different manners using one or more different loss functions in accordance with various aspects of the technology described herein. For instance, in some configurations, the parametric model is trained using a reconstruction loss. In some embodiments, the training dataset 112 comprises training composite images and a ground truth harmonized image for each training composite images. The ground truth harmonized image for a given training composite image could be, for instance, a version of the training composite image that has been manually harmonized by a user or automatically harmonized using an automatic image harmonization process. The parametric model can be trained using the image dataset 122 by iteratively providing a training composite image as input to the parametric model to generate a harmonized composite image, determining a reconstruction loss based on the harmonized composite image and the ground truth harmonized image for the input training composite image, and updating the parametric model based on the reconstruction loss (e.g., by updating parameter/weights of the color curves prediction model and the shadow map prediction model via backpropagation).

In accordance with some aspects, the training component 112 employs a training approach that bridges domain gaps between training and testing data in previous learning-based approaches to image harmonization. Domain gap 1: during training in previous approaches, composite images are generated by randomly adjusting the foreground appearance of real images. Those adjustments (augmentations) are fixed (either before or during the training) and are usually global edits (e.g., global color mapping, LUTs, luminosity adjustments). However, at test time, the differences between the foreground and background are much more diverse and arbitrary. Domain gap 2: during training in previous approaches, although the global appearances (e.g., color, luminosity) of the foreground of the input composite image are different compared to the background, they are still "coupled" together in other aspects. For example, they share the same lighting environment, have consistent shadows and consistent foreground/background boundaries. However, during testing, the foreground object and the background are from two different images, and do not share any common information. Some aspects of the technology described herein bridge these domain gaps by using 1) a parametric model for efficient and any-resolution image harmonization, and 2) and an adversarial training strategy with real composite images as inputs.

Figure 4:
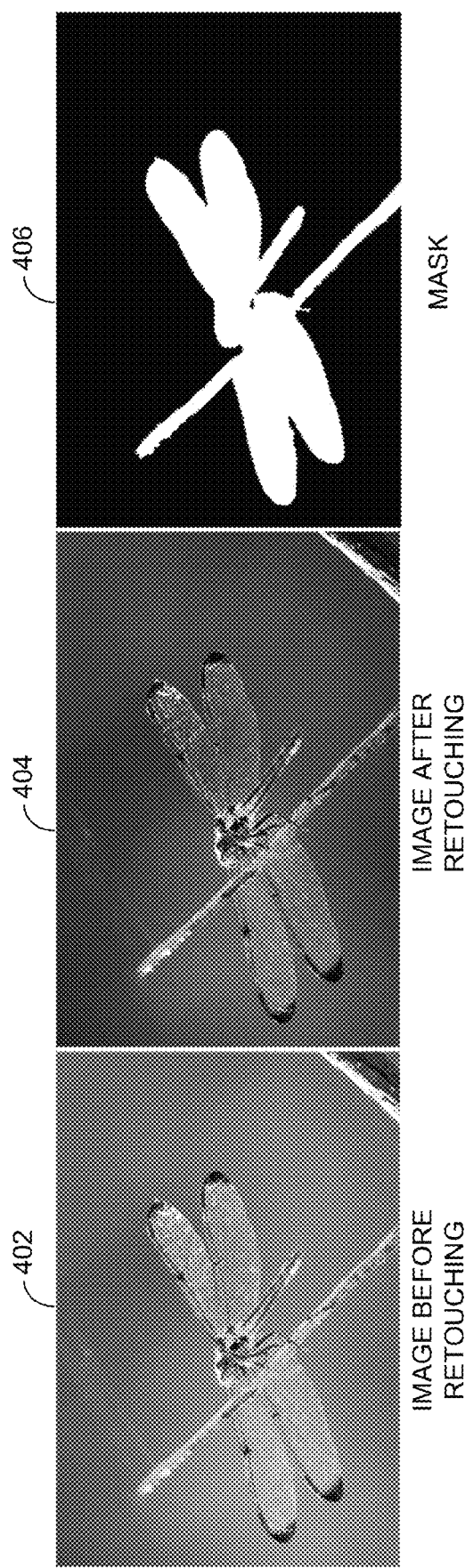
FIG. 4 illustrates a before-retouching image, after-retouching image, and segmentation mask used for training a parametric model for composite image harmonization in accordance with some implementations of the present disclosure.

With the aim of bridging the first domain gap, in some configurations, the training dataset 122 used to train the parametric model includes three types of images: (1) images (which can be high resolution) before retouching; (2) images (which can be high resolution) after retouching; and (3) segmentations masks (which can be high resolution) identifying foregrounds and backgrounds in the images. FIG. 4 presents an example that shows an image 402 before retouching, an image 404 after retouching has been applied to the image 402, and a segmentation mask 406 that segments a foreground and a background for the image 402 and the image 404. The retouching performed on images can be user retouches or computer-generated retouches. In some aspects, the training dataset 122 dataset is obtained from a large collection of user-edited images, such that it contains more diverse and vivid edits compared to datasets used in training in other approaches.

The following notation is used herein to refer to these images: images before user retouching (before-retouching images) are noted as $I_i^{pre}=\{F_i^{pre}\ B_i^{pre}\}$; 2) images after user retouching (after-retouching images) are noted as $I_i^{after}=\{F_i^{after}\ B_i^{after}\}$; and 3) segmentation masks are noted as $M_i$, where i=1, 2, 3, ..., N (N is the number of training samples), I represents the image, F and B denote the foreground and background respectively.

In accordance with some aspects, the training component 112 uses two training approaches to train the parametric model, including: (1) supervised training using a reconstruction loss; and (2) unsupervised training using an adversarial loss. The supervised training synthesizes composite images by combining foregrounds and backgrounds from corresponding before-retouching and after-retouching images. For instance, one composite image could be generated by combining the foreground of the image 402 with the background of the image 404 of FIG. 4, and another composite image could be generated by combining the foreground of the image 404 with the background of the image 402 of FIG. 4 (using the segmentation mask 406 to identify the foreground and background in each image). As used herein, $I_i^{pre-after}=\{F_i^{pre}, B_i^{after}\}$ denotes the composite image with before-retouching foreground and after-retouching background, and $I_i^{after-pre}=\{F_i^{after}, B_i^{pre}\}$ denotes the composite image with after-retouching foreground and before-retouching background. Note that here $I_i^{pre-after}$ can be viewed as an augmentation of $I_i^{after}$ while $I_i^{after-pre}$ is an augmentation of $I_i^{pre}$. Accordingly, given the i-th before-after retouching image pair from the training dataset 122, two composite images can be generated: $I_i^{after-pre}$ and Ire-after, with the ground-truth of those composite images being $I_i^{pre}$ and $I_i^{after}$ respectively.

To train the parametric model using supervised training, the training component 112 provides a composite image as input to the parametric model, which outputs a harmonized composite image. A reconstruction loss is determined based on the harmonized composite image and the corresponding ground truth image for the input composite image (e.g., given a composite image $I_i^{after-pre}$, the ground truth image is $I_i^{pre}$; and given a composite image $I_i^{pre-after}$, the ground truth image is $I_i^{after}$) The training component 112 determines the reconstruction loss and updates the parametric model (e.g., by backpropagation) using the reconstruction loss. In some aspects, an $\ell_1$-reconstruction loss $\mathcal{L}_i^{rec}$ c is determined as follows:

$$\mathcal{L}_i^{rec}=\|f_\theta(I_i^{pre-after})-I_i^{after}\|_1+\|f_\theta(I_i^{after-pre})-I_i^{pre}\|_1 \quad (1)$$

Figure 5:
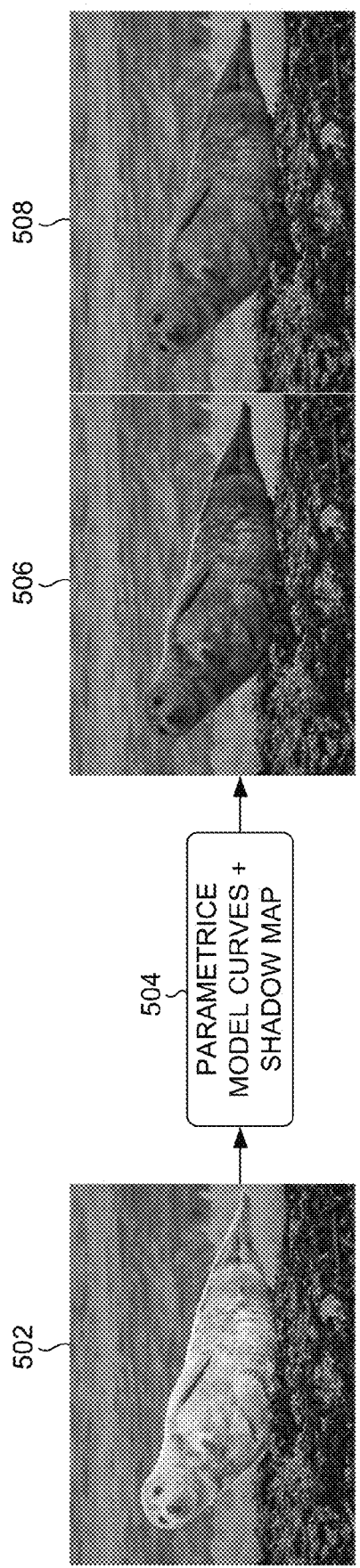
FIG. 5 is a diagram showing an example of supervised training of a parametric model for composite image harmonization in accordance with some implementations of the present disclosure.

FIG. 5 is a diagram showing an example of supervised training of a parametric model for composite image harmonization. As shown in FIG. 5, a composite image 502 is provided as input to a parametric model 504 being trained. The composite image 502 can be a synthesized composite image by combining a foreground and background from corresponding before-retouching and after-retouching images, as discussed above. Given the composite image 502, the parametric model 504 predicts color curve parameters and a shadow map, which are applied to the composite image 502 to provide a harmonized composite image 506. A reconstruction loss is determined based on the harmonized composite image 506 and a ground truth image 508. The ground truth image 508 can be $I_i^{pre}$ when the input composite image 502 is $I_i^{after-pre}$ or $I_i^{after}$ when the input composite image 502 is $I_i^{pre-after}$.

Figure 6A:
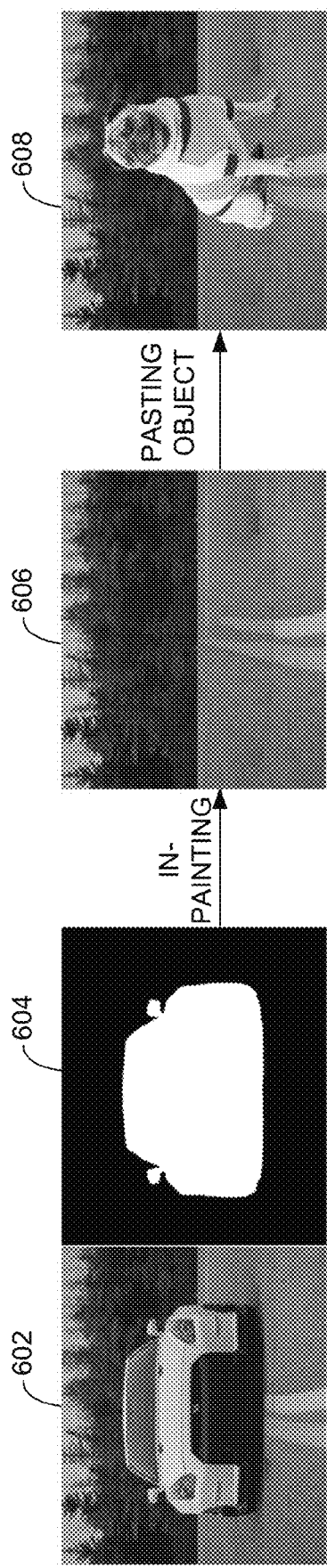
FIGS. 6A and 6B are diagrams showing generating of composite image and using the composite for supervised training of a parametric model for composite image harmonization in accordance with some implementations of the present disclosure.

To bridge the second domain gap previously discussed, the training component 112 can also employ unsupervised training. To decouple the foreground and the background, the unsupervised training uses composite images generated from different images (i.e., images having different foregrounds and backgrounds) as opposed to the before-retouching image/after-retouching image pairs used by the supervised training (which have the same foregrounds and backgrounds). Given a real image $I_i=\{F_i, B_i\}$; (can be either before or after retouching), the foreground mask can be dilated in-painting performed to get an in-painted background image $B_i^{in}$, where in stands for "inpainted". Then, a foreground object from another image $F_j$ is pasted to $B_i^{in}$ to generate the composite image $I_i^{comp}=\{F_j, B_i^{in}\}$. FIG. 6A provides an example of generation of a composite image in this manner. As shown in FIG. 6A, given an image 602 and a segmentation mask 604, a foreground is removed from the image 602 and in-painting is performed to generate an in-painted background image 606. A foreground object is pasted to the in-painted background image 606 to generate a composite image 608.

Since there is no ground-truth for this composite image, $I_i^{comp}$, the $l_1$-loss cannot be used. Instead, an adversarial loss is used. Considering that the parametric model adjusts color curves and shadows, it has strong constraints and will not generate spurious fake content in the output image (a common downside in GANs). To train the parametric model using unsupervised training, the training component 112 provides a composite image $I_i^{comp}$ as input to the parametric model, which outputs a harmonized composite image. Adversarial loss is used for training, where the harmonized composite image $f_\theta(I_i^{comp})$ is considered a "fake" example for a discriminator. In some instances, a real image $I_i$ is used as a "real" example for the discriminator. In some aspects, to prevent the discriminator from using the "coupled" boundaries from $I_i$ as a cue for its decision, the foreground object $F_i$ from an image is painted to the in-painted background $B_i^{in}$ for that image, which breaks the boundary consistency typical of real photos, and generates pseudo-real image $I_i^{pseudo} = \{F_i, B_i^{in}\}$, which are considered as the "real" example for the discriminator. Generally, the discriminator is a neural network trained to predict example images as either fake or real. Any of a number of discriminator architectures can be employed. The training component 112 determines an adversarial loss and updates the parametric model (e.g., by backpropagation) using the adversarial loss.

Figure 6B:
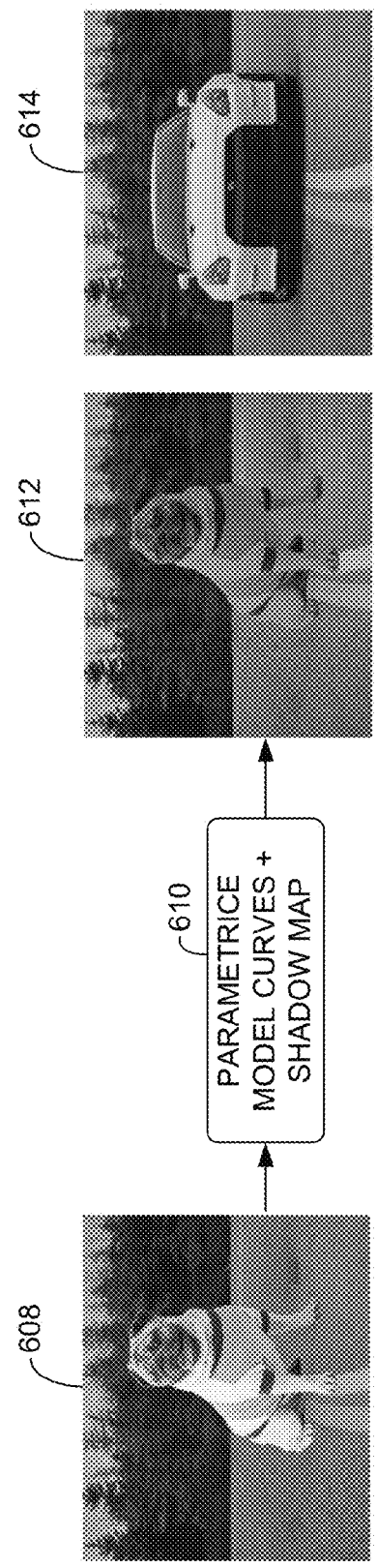

FIG. 6B provides an example of the unsupervised training. As shown in FIG. 6B, the composite image 608 from FIG. 6A is provided as input to a parametric model 610 being trained. Given the composite image 608, the parametric model 610 predicts color curve parameters and a shadow map, which are applied to the composite image 608 to provide a harmonized composite image 612. The harmonized composite image 612 is treated as a fake example for the discriminator, while an image 614 (a real image or real image with foreground extraction, background in-painting, and foreground insertion) is used as a real example for the discriminator.

Given the reconstruction loss and adversarial loss, the overall loss function can be represented as follows:

$$\mathcal{L}_i^{all} = \lambda_{rec} \mathcal{L}_i^{recon} + \mathcal{L}_i^{adv}, \quad (2)$$

where $\lambda_{rec}$ is a hyper-parameter balancing $\mathcal{L}_i^{recon}$ and $\mathcal{L}_i^{adv}$, and can be empirically set (e.g., empirically set to 4 in some experiments).

With reference again to FIG. 1, the image processing system 104 further includes a user interface component 114 that provides one or more user interfaces for interacting with the image processing system 104. The user interface component 114 provides user interfaces to a user device, such as the user device 102 (which includes the application 108 for interacting with the image processing system 104). For instance, the user interface component 114 can provide user interfaces for, among other things, receiving composite images for harmonization and outputting harmonized composite images generated using predicted color curve parameters and shadow maps. In some aspects, the user interfaces can output the predicted color curve parameters and/or shadow maps used to harmonize a composite image. The user interfaces may further include user interface elements enabling a user to modify the predicted color curve parameters and/or shadow map to further enhance the harmonized composite image.

Figure 7:
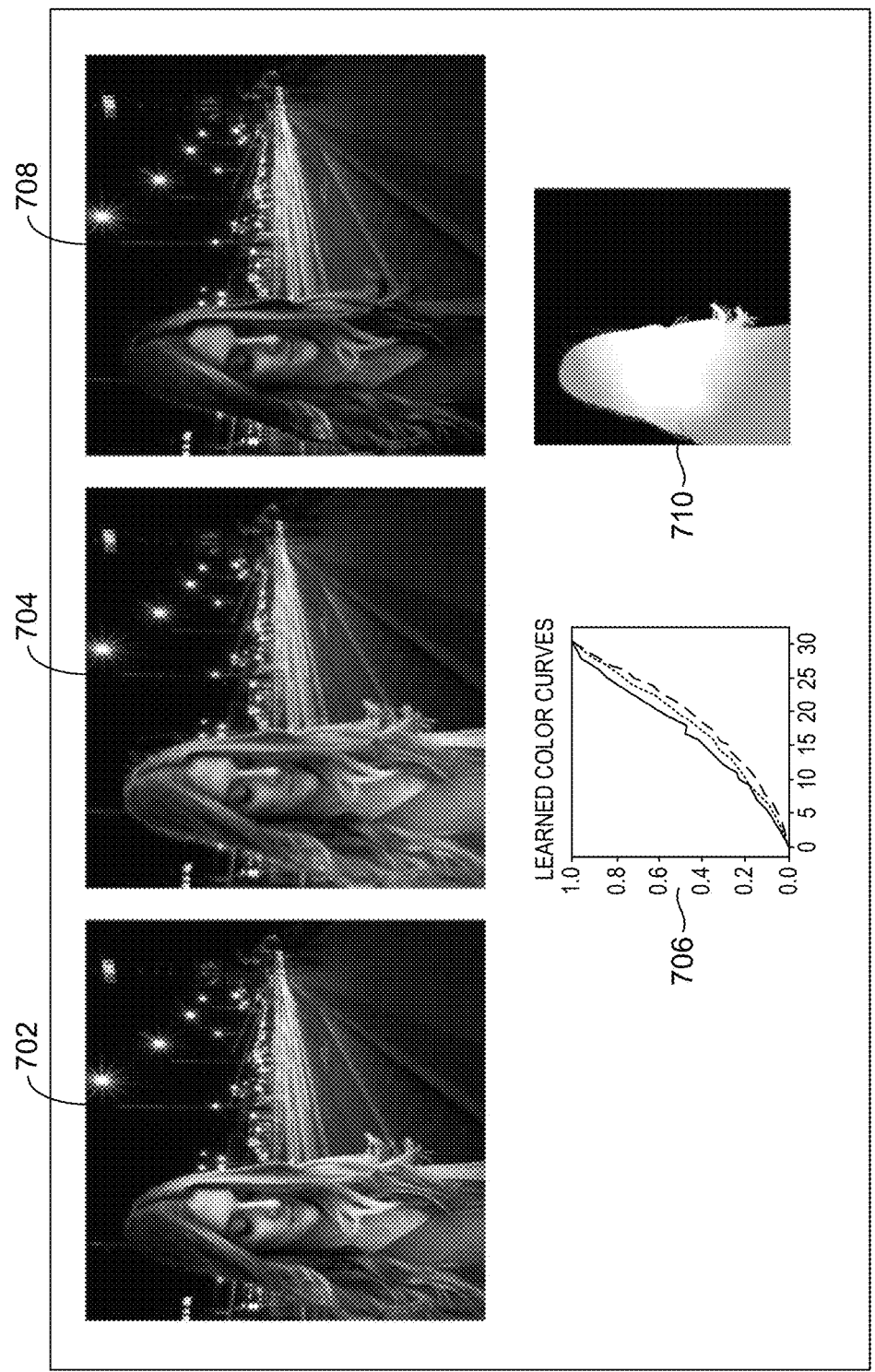
FIG. 7 is diagram showing an example user interface showing a harmonized composite image with predicted color curves parameters and shadow map used to provide the harmonized composite image in accordance with some implementations of the present disclosure.

FIG. 7 provides an example user interface 700 providing output from the image harmonization process described herein. The user interface 700 displays the composite image 702 provided as input for image harmonization. The user interface 700 also displays a first-stage harmonized composite image 704 in which color curve parameters predicted by the system have been applied to the original composite image 702. The predicted color curve parameters 706 are also displayed. The user interface 700 further displays a second stage harmonized composite image 708 in which a shadow map predicted by the system has also been applied. The predicted shadow map 710 is also displayed. It should be noted that the user interface 700 is provided by way of example only and not limitation. In other embodiments, a user interface can include any combination of an original composite image, first-stage harmonized composite image, a second harmonized composite image, predicted color curve parameters, and predicted shadow map.

In some configurations, the user interface 700 provides user interface elements for receiving user input modifying the predicted color curve parameters 706 and/or predicted shadow map 710. A harmonized composite image displayed by the user interface (e.g., the first-stage harmonized composite image 704 and/or the second-stage harmonized composite image 708) are updated based on the modifications. In this way, the user can adjust the predicted color curve parameters and/or shadow map to further modify a harmonized composite image.

Figure 8:
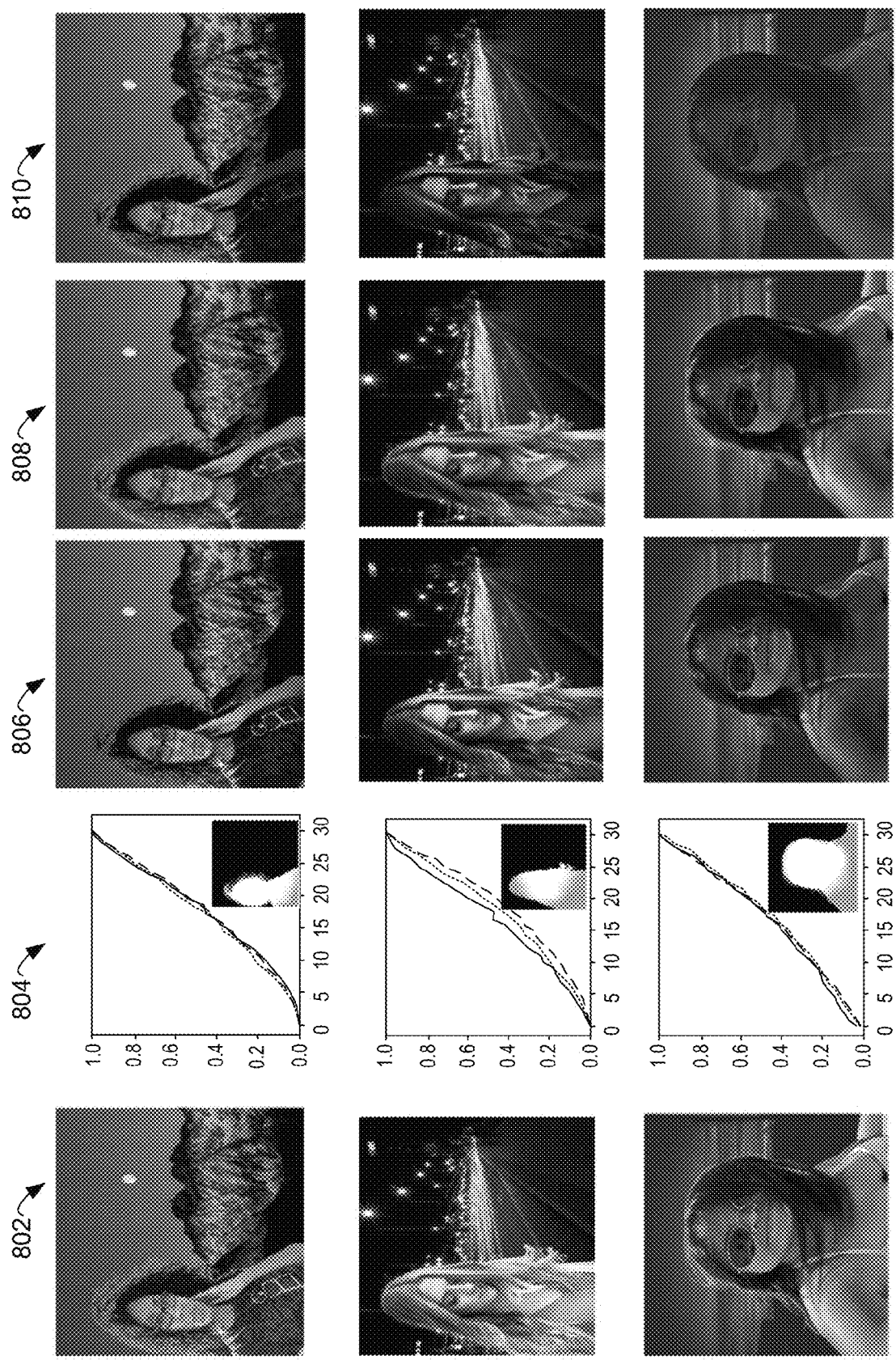
FIG. 8 is a diagram comparing harmonized composite images using the technology described herein against harmonized composite images from a previous image harmonization system and harmonized composite images generated manually by users.

FIG. 8 provides examples of harmonized composite images using aspects of the technology described herein as compared against harmonized composite images from a previous approach and harmonized composite images generated manually by users. More particularly, column 802 shows input composite images. Column 804 shows color curve parameters and shadow maps predicted for the corresponding input composite images using aspects of the technology described herein, and column 806 shows harmonized composite images provided by applying the predicted color curve parameters and shadow maps. As a comparison, column 808 shows harmonized composite images generated using a previous automatic harmonization approach, and column 810 shows harmonized composite images generated manually by users adjusting aspects of the input composite images.

As shown in FIG. 8, the harmonized composite images 806 using the technology described herein successfully match the foreground appearance to the background, while the harmonized composite images 808 from the previous approach fail to deliver faithful and plausible harmonization results. Interestingly, looking closely at the hair boundary of the foreground portraits, the technology described herein effectively eliminates the boundary mismatch and gives a smooth and natural boundary transition. In contrast, the hair boundary color/transparency mismatch can be seen in the harmonized composite images 808 from the previous approach, and some of the manually-harmonized composite images 810. The predicted color curve parameters from the technology described herein act as global color mapping functions while the predicted shadow maps incorporate more local editing. Numerically, the model using the technology described herein outperforms the previous approach, with a PSNR of 27.75 dB (vs. 27.62 dB) and LPIPS error of 0.030840 (vs. 0.031897) on this dataset.

Example Methods for Parametric Composite Image Harmonization

Figure 9:
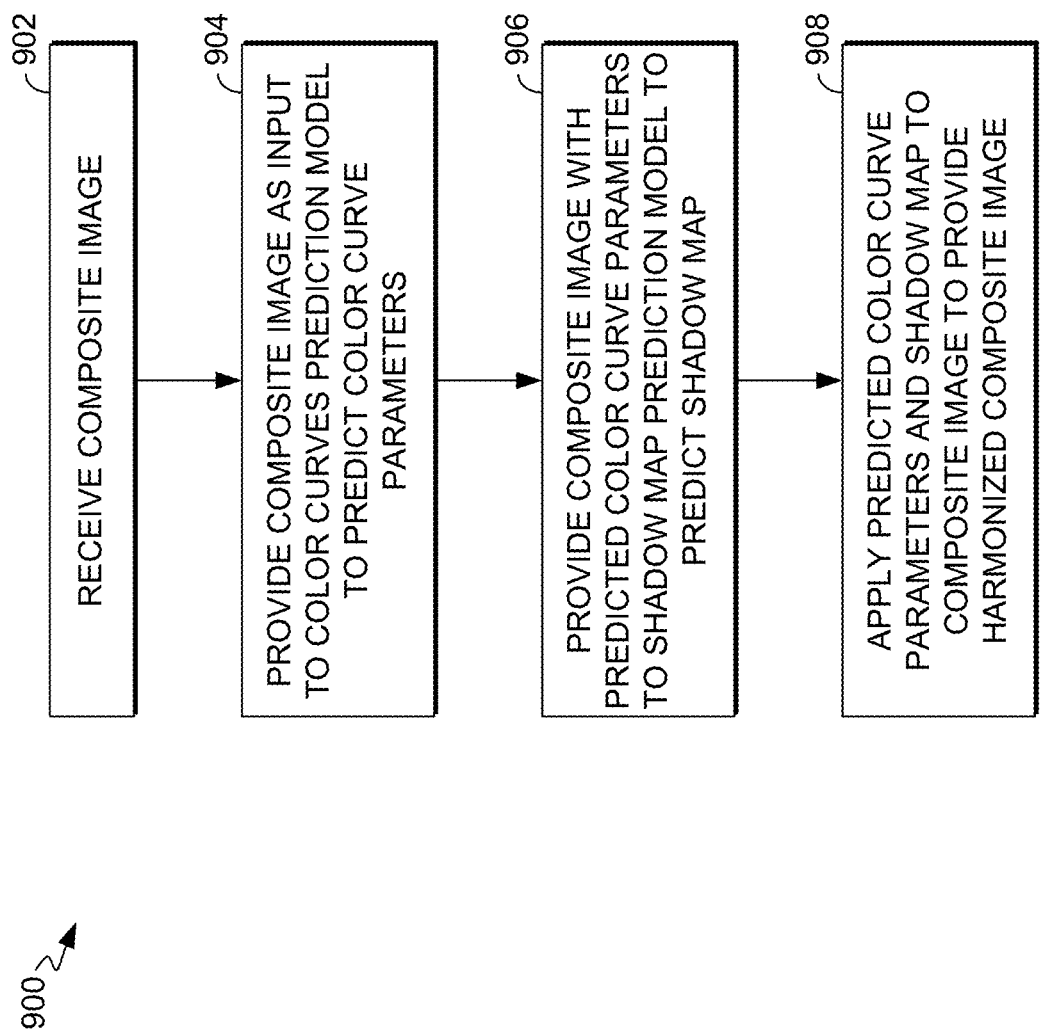
FIG. 9 is a flow diagram showing a method for parametric image harmonization of a composite image in accordance with some implementations of the present disclosure.

With reference now to FIG. 9, a flow diagram is provided that illustrates a method 900 for parametric image harmonization of a composite image. The method 900 can be performed, for instance, by the image harmonization component 110 of FIG. 1. Each block of the method 900 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 902, a composite image is received for performing image harmonization on the composite image. The composite image can include, for instance, a foreground and background from different images. The composite image is provided as input to a color curves prediction model to predict color curve parameters, as shown at block 904. The composite image is provided with the color curve parameters to a shadow map predict model to predict a shadow map, as shown at block 906. The color curve parameters and shadow map are applied to the foreground of the composite image to provide a harmonized composite image, as shown at block 908. The harmonized composite image, color curve parameters, and/or shadow map can be provided for presentation to a user.

Figure 10:
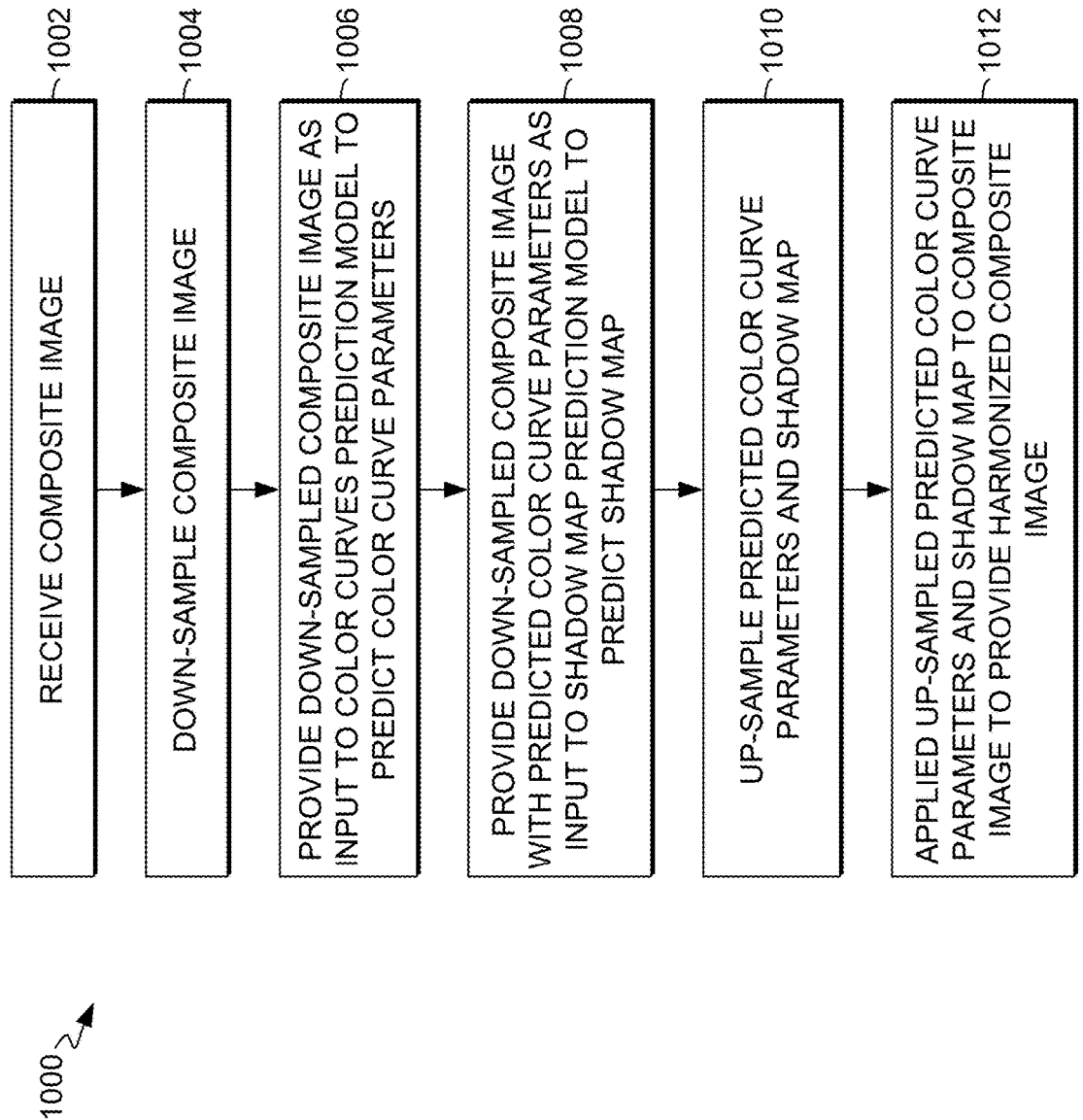
FIG. 10 is a flow diagram showing another method for parametric image harmonization of a composite image in accordance with some implementations of the present disclosure.

FIG. 10 provides a flow diagram showing another method 1000 for parametric image harmonization of a composite image. The method 1000 can be performed, for instance, by the image harmonization component 110 of FIG. 1. As shown at block 1002, a composite image is received for performing image harmonization on the composite image. The composite image can include, for instance, a foreground and background from different image. The composite image is down-sampled at block 1004 to provide a down-sampled composite image. For instance, the original composite image could have a 4 k resolution while the down-sampled composite image has a 512×512 resolution. The down-sampled composite image is provided as input to a color curves prediction model to predict color curve parameters, as shown at block 1006. The down-sampled composite image is provided with the color curve parameters to a shadow map prediction model to predict a shadow map, as shown at block 1008. The predicted color parameters and shadow map are up-sampled at block 1010. The up-sampled color curve parameters and shadow map are applied to the foreground of the composite image (e.g., the original higher resolution composite image) to provide a harmonized composite image, as shown at block 1012. The harmonized composite image, color curve parameters, and/or shadow map can be provided for presentation to a user.

Figure 11:
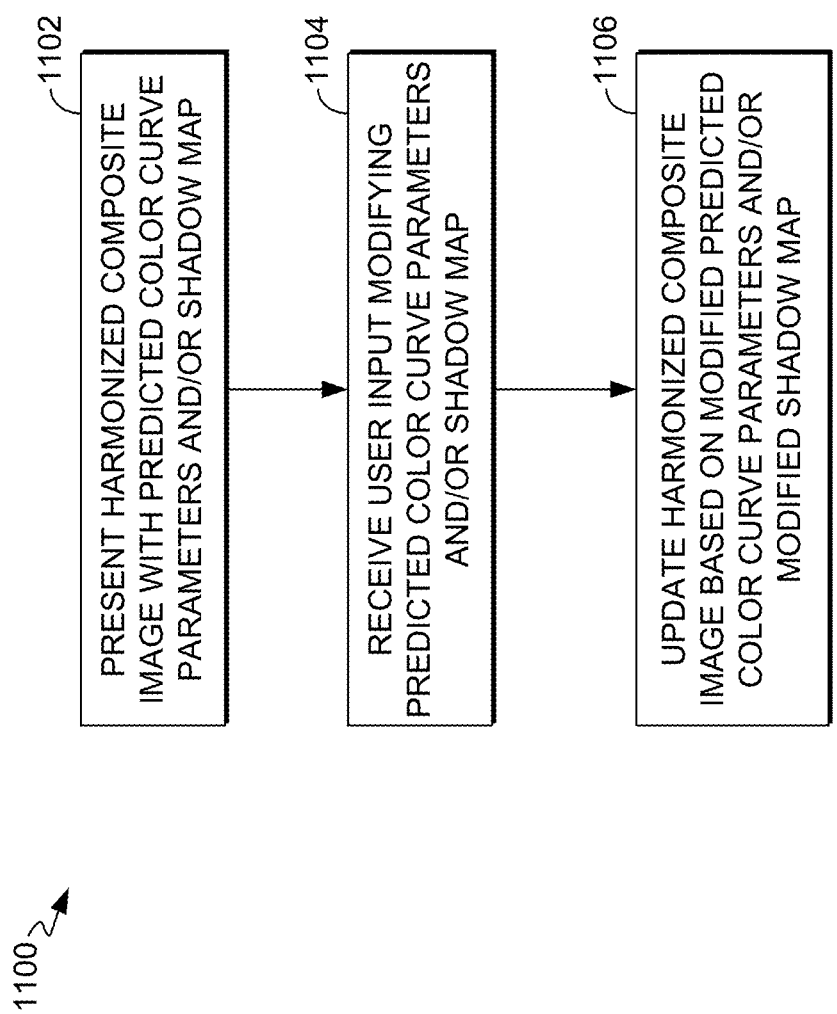
FIG. 11 is a flow diagram showing a method for modifying a harmonized composite image in accordance with some implementations of the present disclosure.

Turning next to FIG. 11, a flow diagram is provided showing a method 1100 for modifying a harmonized composite image. The method 1100 can be performed, for instance, by the user interface component 114 of FIG. 1. As shown at block 1102, a harmonized composite image is presented with predicted color curve parameters and/or shadow map as output from a composite image harmonization process, such as the method 900 or 1000 described above with reference to FIGS. 9 and 10, respectively. For instance, a user interface could be provided that displays the harmonized composite image with predicted color curve parameters and/or shadow map applied to an input composite image to harmonize the composite image. User input modifying the color curve parameters and/or shadow map is received, at block 1104. For instance, the user interface could include user interface elements for receiving user input modifying the color curve parameters and/or shadow map. The harmonized composite image is updated based on the modified predicted color curve parameters and/or modified shadow map, as shown at block 1106. This may include updating the harmonized composite image displayed on the user interface. The process of receiving user input modifying the color curve parameters and/or shadow map at block 1104 and updating the harmonized composite image at block 1106 can be repeated. In this way, the user can further modify the harmonized composite image provided by the system since the color curve parameters and shadow map predicted by the system for image harmonization are exposed to the user.

Figure 12:
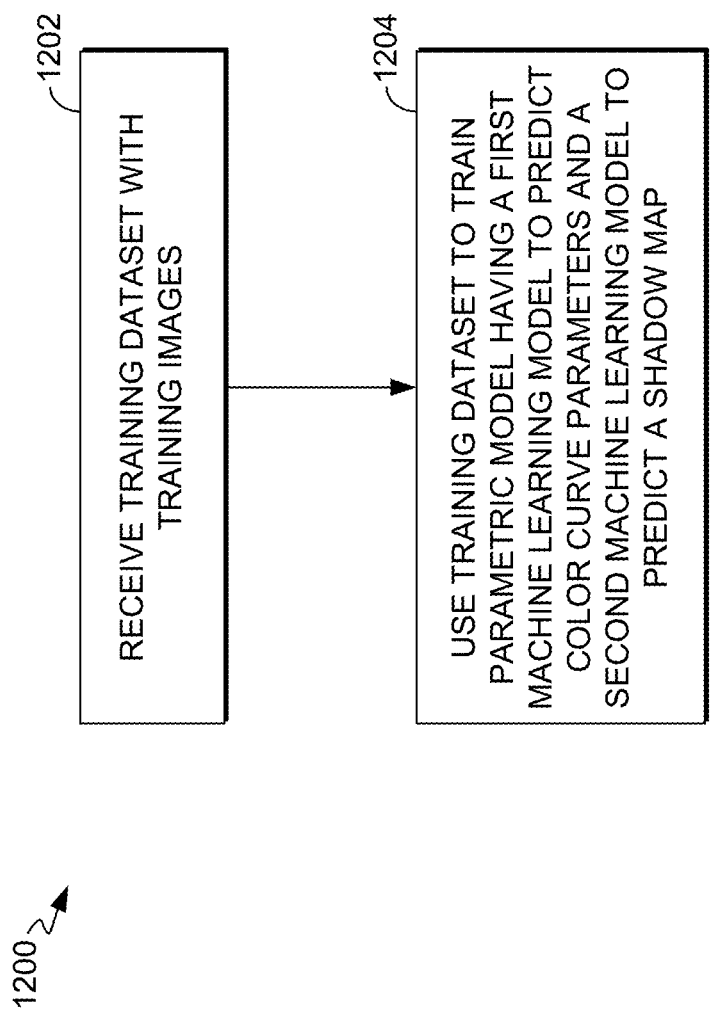
FIG. 12 is a flow diagram showing a method for training a parametric model for composite image harmonization in accordance with some implementations of the present disclosure.

With reference now to FIG. 12, a flow diagram is provided showing a method 1200 for training a parametric model for composite image harmonization. The method 1200 can be performed, for instance, by the training component 112 of FIG. 1. As shown at block 1202, a training dataset is received with training image. The training dataset is used to train a parametric model having a first machine learning model to predict color curve parameters and a second machine learning model to predict a shadow map, as shown at block 1204.

Figure 13:
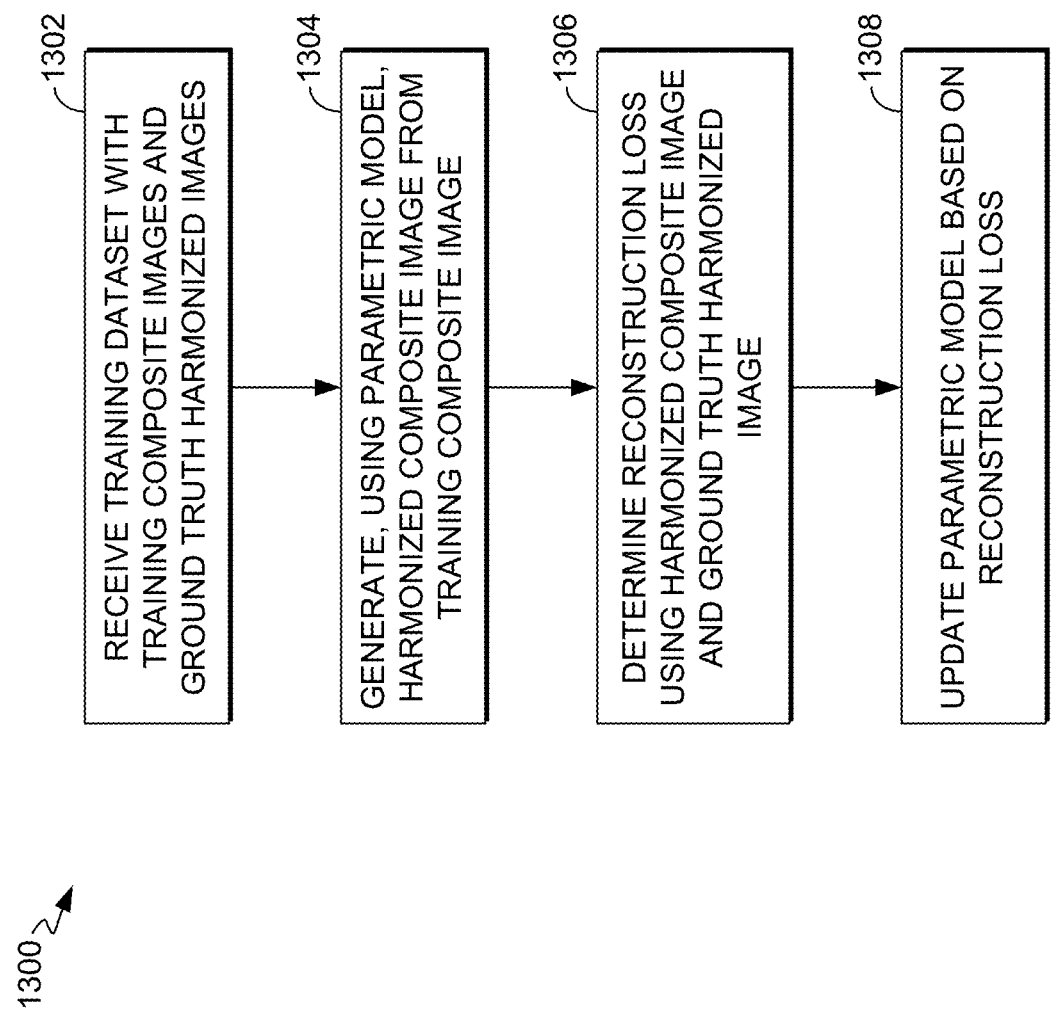
FIG. 13 is a flow diagram showing another method for training a parametric model for composite image harmonization in accordance with some implementations of the present disclosure.

FIG. 13 provides a flow diagram showing another method 1300 for training a parametric model for composite image harmonization. The method 1300 can be performed, for instance, by the training component 112 of FIG. 1. As shown at 1302, a training dataset with training composite images and ground truth harmonized images is received. The training dataset could include a ground truth harmonized image for each training composite image. The ground truth harmonized image for a given training composite image could have been manually harmonized by a user (e.g., by the user adjusting image parameters) or harmonized using an automatic image harmonization process. A given training composite image from the training dataset is provided as input to a parametric model being trained, which generates a harmonized composite image, as shown at block 1304. In particular, the parametric model includes a color curves prediction model that predicts color curve parameters and a shadow map prediction model that predicts a shadow map, and the predicted color curve parameters and shadow map are applied to the given training composite image to generate the harmonized composite image.

As shown at block 1306, a reconstruction loss is determined using the harmonized composite image and the ground truth harmonized image corresponding to the given training composite image. The parametric model is updated based on the reconstruction loss, as shown at block 1308. For instance, parameters (e.g., weights) of the color curves prediction model and/or the shadow map prediction model are updated based on the reconstruction loss. The process of blocks 1304 through 1308 can be repeated for a number of training composite images from the training dataset to train the parametric model.

Figure 14:
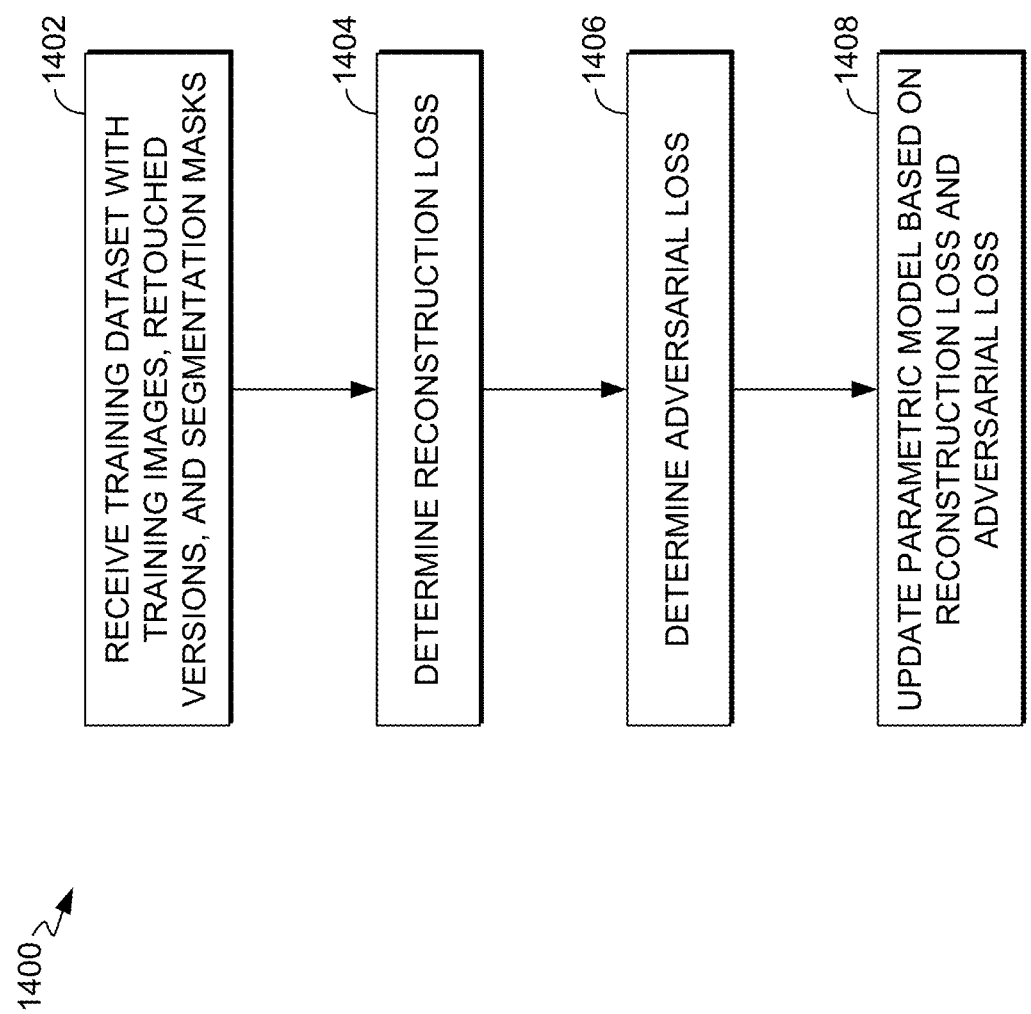
FIG. 14 is a flow diagram showing a further method for training a parametric model for composite image harmonization in accordance with some implementations of the present disclosure.

Turning next to FIG. 14, a flow diagram is providing showing a further method 1400 for training a parametric model for composite image harmonization. The method 1400 can be performed, for instance, by the training component 112 of FIG. 1. As shown at block 1402, a training dataset is received that includes training images, a retouched version of each training image, and a segmentation mask for each training image segmenting a foreground and a background of the corresponding training image. A reconstruction loss is determined using the training dataset, as shown at block 1404. The reconstruction loss can be determined, for instance, using the method 1500 discussed below with reference to FIG. 15 An adversarial loss is determined using the training dataset, as shown at block 1406. The adversarial loss can be determined, for instance, using the method 1600 discussed below with reference to FIG. 16. As shown at block 1408, the parametric model is updated based on the reconstruction loss and the adversarial loss. For instance, parameters (e.g., weights) of the color curves prediction model and/or the shadow map prediction model can be updated based on the reconstruction loss and adversarial loss.

Figure 15:
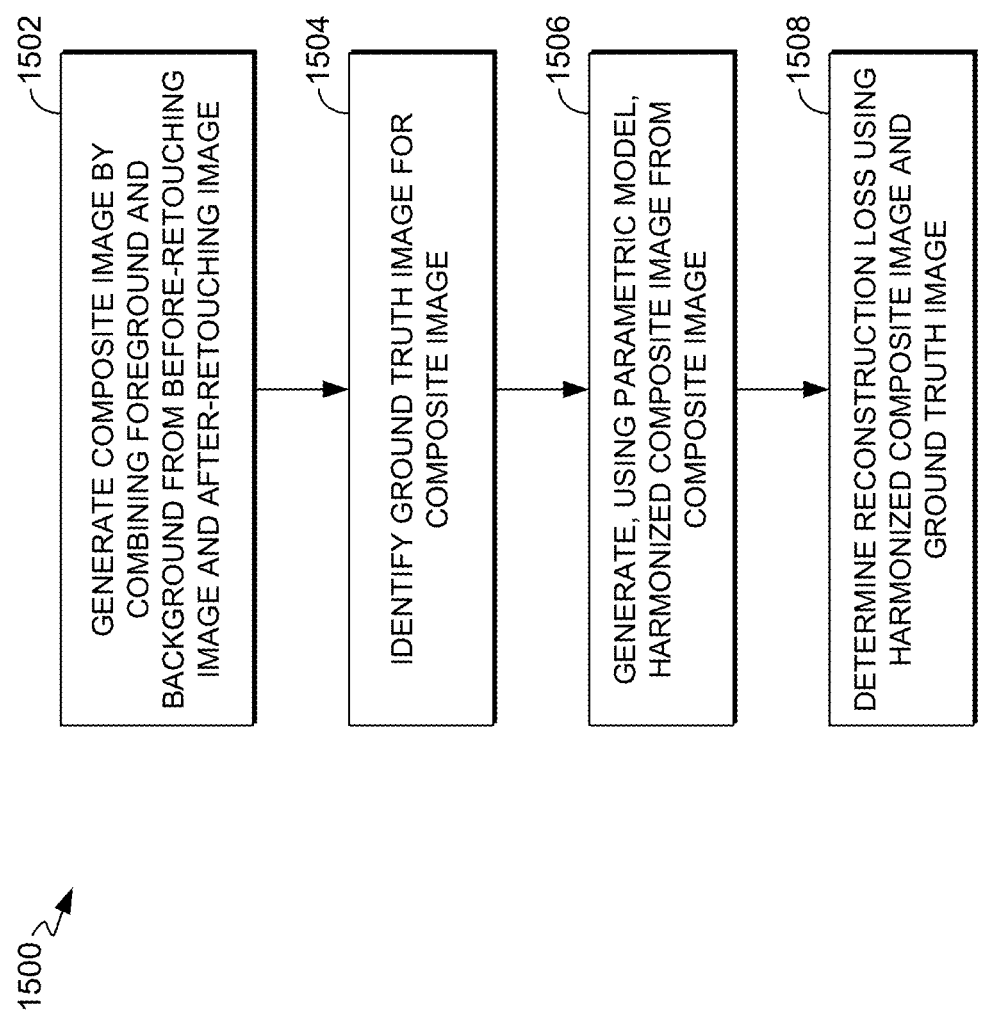
FIG. 15 is a flow diagram showing a method for determining a reconstruction loss for training a parametric model for composite image harmonization in accordance with some implementations of the present disclosure.

FIG. 15 provides a flow diagram showing a method 1500 for determining a reconstruction loss for training a parametric model for composite image harmonization. The method 1500 can be performed, for instance, by the training component 112 of FIG. 1. As shown at block 1502, given a training dataset with a training image (i.e., before-retouching image), a retouched version of the training image (i.e., after-retouching image), and a segmentation mask segmenting a foreground and background, a composite image is generated by combining a foreground from the before-retouching image and a background from the after-retouching image (or vice versa). A ground truth image is identified for the composite image, as shown at block 1504. In the case in which the composite image comprises the foreground from the before-retouching image and the background from the after-retouching image, the ground truth image comprises the after-retouching image. In the case in which the composite image comprises the foreground from the after-retouching image and the background form the before-retouching image, the ground truth image comprises the before-retouching image.

As shown at block 1506, the composite image is provided as input to a parametric model being trained to generate a harmonized composite image. In particular, the parametric model includes a color curves prediction model that predicts color curve parameters and a shadow map prediction model that predicts a shadow map, and the predicted color curve parameters and shadow map are applied to the composite image to generate the harmonized composite image. A reconstruction loss is determined at block 1508 using the harmonized composite image generated by the parametric model and the ground truth image. The method 1500 can be performed for each of a number of training images from the training dataset to determine reconstruction losses that are used to update parameters of the parametric model.

Figure 16:
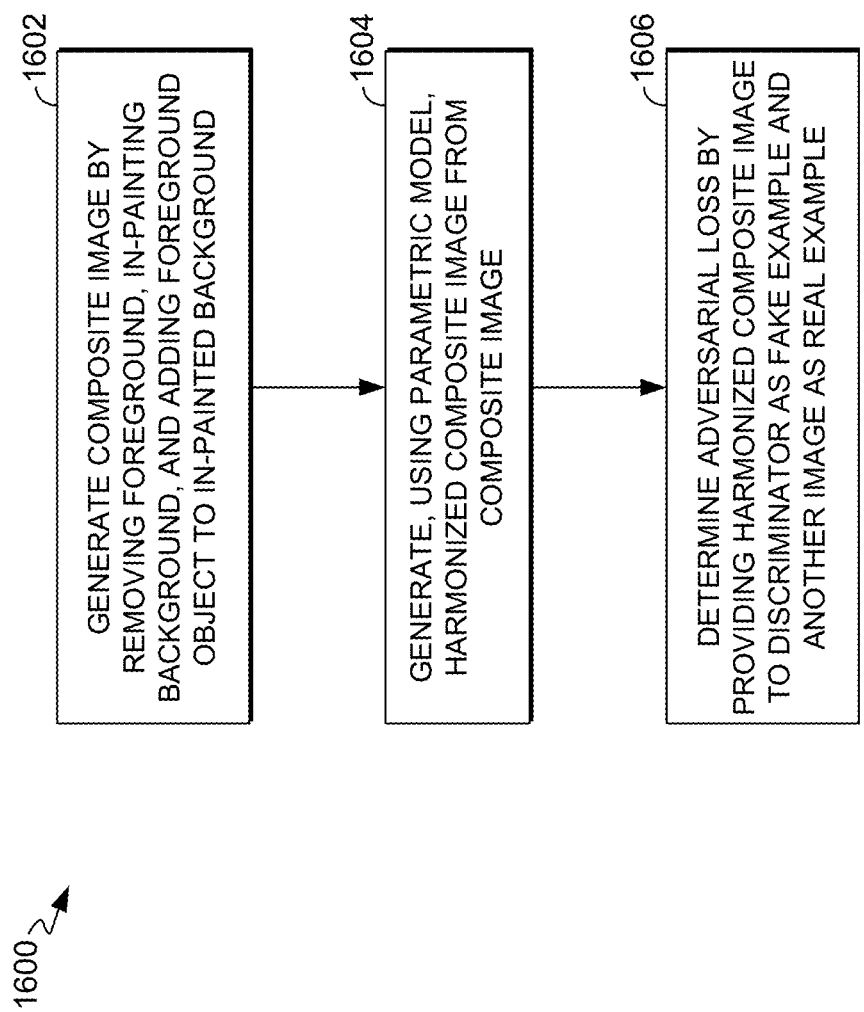
FIG. 16 is a flow diagram showing another method for determining an adversarial loss for training a parametric model for composite image harmonization in accordance with some implementations of the present disclosure.

FIG. 16 provides a flow diagram showing a method 1600 for determining an adversarial loss for training a parametric model for composite image harmonization. The method 1600 can be performed, for instance, by the training component 112 of FIG. 1. As shown at block 1602, a composite image is generated from a training image by removing a foreground of the training image, in-painting the remaining background of the training image, and adding a foreground object to the in-painted background.

As shown at block 1604, the composite image is provided as input to a parametric model being trained to generate a harmonized composite image. In particular, the parametric model includes a color curves prediction model that predicts color curve parameters and a shadow map prediction model that predicts a shadow map, and the predicted color curve parameters and shadow map are applied to the composite image to generate the harmonized composite image. An adversarial loss is determined at block 1606 by providing the harmonized composite image as a "fake" example to a discriminator and another image as a "real" example for the discriminator. The method 1600 can be performed for each of a number of training images from the training dataset to determine adversarial losses that are used to update parameters of the parametric model.

Exemplary Operating Environment

Figure 17:
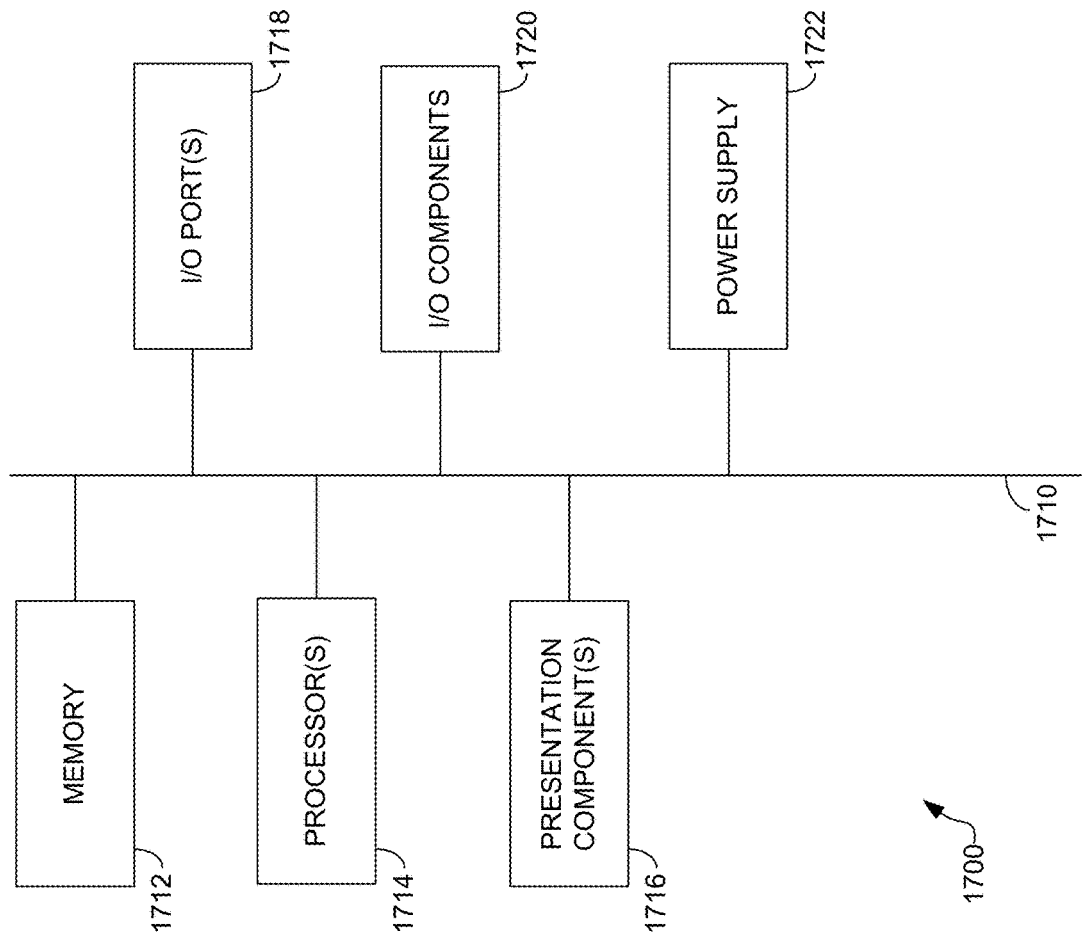
FIG. 17 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 17 in particular, an exemplary operating environment for implementing embodiments of the present technology is shown and designated generally as computing device 1700. Computing device 1700 is but one example of a suitable computing environment and is not intended to suggest any limitation as to the scope of use or functionality of the technology. Neither should the computing device 1700 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 17, computing device 1700 includes bus 1710 that directly or indirectly couples the following devices: memory 1712, one or more processors 1714, one or more presentation components 1716, input/output (I/O) ports 1718, input/output components 1720, and illustrative power supply 1722. Bus 1710 represents what can be one or more busses (such as an address bus, data bus, or combination thereof). Although the various blocks of FIG. 17 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 17 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 17 and reference to "computing device."

Computing device 1700 typically includes a variety of computer-readable media. Computer-readable media can be any available media that can be accessed by computing device 1700 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1712 includes computer storage media in the form of volatile and/or nonvolatile memory. The memory can be removable, non-removable, or a combination thereof. Exemplary hardware devices include solid-state memory, hard drives, optical-disc drives, etc. Computing device 1700 includes one or more processors that read data from various entities such as memory 1712 or I/O components 1720. Presentation component(s) 1716 present data indications to a user or other device. Exemplary presentation components include a display device, speaker, printing component, vibrating component, etc.

I/O ports 1718 allow computing device 1700 to be logically coupled to other devices including I/O components 1720, some of which can be built in. Illustrative components include a microphone, joystick, game pad, satellite dish, scanner, printer, wireless device, etc. The I/O components 1720 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 1700. The computing device 1700 can be equipped with depth cameras, such as, stereoscopic camera systems, infrared camera systems, RGB camera systems, and combinations of these for gesture detection and recognition. Additionally, the computing device 1700 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. A computer-implemented method comprising:
generating, using a first machine learning model, color curve parameters for a composite image having a foreground from a first image and a background from a second image;
applying the color curve parameters to the foreground of the composite image to generate a first-stage harmonized image;
generating, using a second machine learning model, a shadow map by providing the first-stage harmonized image as input to the second machine learning model;
generating a harmonized composite image by applying the shadow map to a foreground of the first-stage harmonized image; and
providing, for presentation, the harmonized composite image.

2. The computer-implemented method of claim 1, wherein generating the color curve parameters comprises:
providing a down-sampled version of the composite image as input to the first machine learning model to predict initial color curve parameters; and
up-sampling the initial color curve parameters to provide the color curve parameters.

3. The computer-implemented method of claim 1, wherein the method further comprises:
providing, for presentation with the harmonized composite image, a graphical representation of the color curve parameters;
receiving user input modifying the color curve parameters;
updating the harmonized composite image based on the user input modifying the color curve parameters to provide an updated harmonized composite image; and
providing, for presentation, the updated harmonized composite image.

4. The computer-implemented method of claim 1, wherein the method further comprises:
providing, for presentation with the harmonized composite image, a graphical representation of the shadow map;
receiving user input modifying the shadow map to provide a modified shadow map;
updating the harmonized composite image based on the user input modifying the shadow map to provide an updated harmonized composite image; and
providing, for presentation, the updated harmonized composite image.

5. One or more computer storage media storing computer-useable instructions that, when used by a computing device, cause the computing device to perform operations, the operations comprising:
generating, by a first machine learning model, color curve parameters by providing a down-sampled version of a composite image as input to the first machine learning model, the composite image having a foreground from a first image and a background from a second image;
generating, by a second machine learning model, a shadow map by providing the down-sampled version of the composite image with the first color curve parameters as input to the second machine learning model;
up-sampling the color curve parameters to provide up-sampled color curve parameters;
up-sampling the shadow map to provide an up-sampled shadow map; and
generating a harmonized composite image by applying the up-sampled color curve parameters and the up-sampled shadow map to the foreground of the composite image.

6. The one or more computer storage media of claim 5, wherein the shadow map is generated by:
applying the color curve parameters to the down-sampled version of the composite image to provide a first-stage harmonized image; and
providing the first-stage harmonized image as input to the second machine learning model.

7. The one or more computer storage media of claim 5, wherein generating the harmonized composite image by applying the up-sampled color curve parameters and the up-sampled shadow map to the foreground of the composite image comprises:
applying the up-sampled color curve parameters to the foreground in the composite image to generate a first-stage harmonized composite image; and
applying the up-sampled shadow map to the foreground in the first-stage harmonized composite image to generate the harmonized composite image.

8. The one or more computer storage media of claim 5, wherein the operations further comprise:
providing, for presentation, the harmonized composite image with a graphical representation of the up-sampled color curve parameters;
receiving user input modifying the up-sampled color curve parameters;
updating the harmonized composite image based on the user input modifying the up-sampled color curve parameters to provide an updated harmonized composite image; and
providing, for presentation, the updated harmonized composite image.

9. The one or more computer storage media of claim 5, wherein the operations further comprise:
providing, for presentation, the harmonized composite image with a graphical representation of the up-sampled shadow map;
receiving user input modifying the up-sampled shadow map;
updating the harmonized composite image based on the user input modifying the up-sampled shadow map to provide an updated harmonized composite image; and
providing, for presentation, the updated harmonized composite image.

10. A computer system comprising:
a processor; and
a computer storage medium storing computer-useable instructions that, when used by the processor, causes the computer system to perform operations comprising:
receiving a training dataset comprising a plurality of training images; and
training a model to predict color curve parameters and shadow maps for composite images using a reconstruction loss determined using a first training image and an adversarial loss determined using a second training image by:
predicting, by the model using the first training image, first color curve parameters and a first shadow map, generating a first harmonized composite image by applying the first color curve parameters and the first shadow map to the first training image, determining the reconstruction loss based on the first harmonized composite image and a ground truth image for the first training image, predicting, by the model using the second training image, second color curve parameters and a second shadow map, generating a second harmonized composite image by applying the second color curve parameters and the second shadow map to the second training image, and determining the adversarial loss by providing the second training image as a fake example to a discriminator, and updating the model using the reconstruction loss and the adversarial loss.

11. The computer system of claim 10, wherein the first training image is a composite image generated using a first image, a retouched version of the first image, and a segmentation mask identifying a foreground and a background in the first image and the retouched version of the first image.

12. The computer system of claim 11, wherein the first training image is generated by combining the foreground of the first image with the background of the retouched version of the first image; and wherein the ground truth image comprises the retouched version of the first image.

13. The computer system of claim 11, wherein the first training image is generated by combining the background of the first image with the foreground of the retouched version of the first image; and wherein the ground truth image comprises the retouched version of the first image.

14. The computer system of claim 10, wherein the second training image is a composite image generated by:

removing a foreground of a first image to provide a background of the first image;

in-painting the background of the first image to provide an in-painted background; and adding a foreground object to the in-painted background.

15. The computer system of claim 14, wherein the adversarial loss is determined in part by providing a second image as a real example to the discriminator, the second image being generated by:

removing a foreground of an initial version of the second image to provide a background of the initial version of the second image;

in-painting the background of the initial version of the second image to provide a second in-painted background; and adding the foreground of the initial version of the second image to the second in-painted background.

* * * * *